(No Model.)

H. HALL.
CORN PLANTING MACHINE.

No. 557,671. Patented Apr. 7, 1896.

WITNESSES:
John Buckler,
C. Gerst

INVENTOR
Harry Hall,
BY
Edgar Tate & Co
ATTORNEYS.

UNITED STATES PATENT OFFICE.

HARRY HALL, OF SATSUMA HEIGHTS, FLORIDA.

CORN-PLANTING MACHINE.

SPECIFICATION forming part of Letters Patent No. 557,671, dated April 7, 1896.

Application filed December 31, 1895. Serial No. 573,978. (No model.)

*To all whom it may concern:*

Be it known that I, HARRY HALL, a citizen of the United States, and a resident of Satsuma Heights, in the county of Putnam and State of Florida, have invented certain new and useful Improvements in Corn-Planting Machines, of which the following is a specification, reference being had to the accompanying drawings, forming a part thereof, in which similar letters of reference indicate corresponding parts.

This invention relates to corn planters or droppers; and the object thereof is to provide an improved machine or device of this class which is simple in construction and operation and comparatively inexpensive, and which is also perfectly adapted to accomplish the result for which it is intended; and with this and other objects in view the invention consists in the construction, combination, and arrangement of parts hereinafter described and claimed.

The invention is fully disclosed in the following specification, of which the accompanying drawings form a part, in which—

Figure 1:
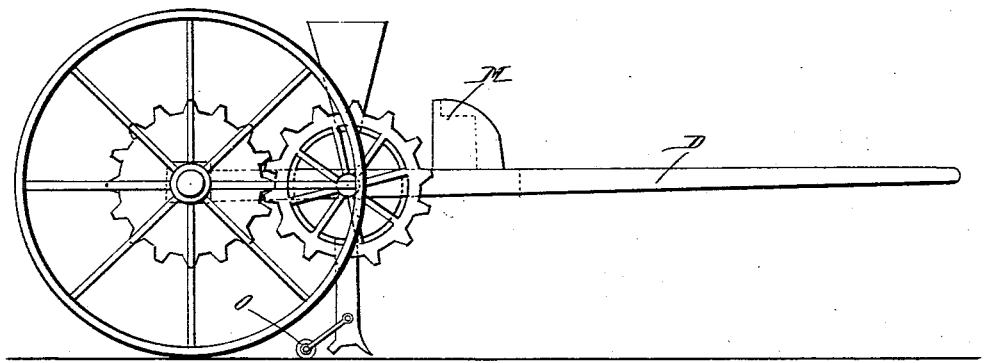
Figure 2:
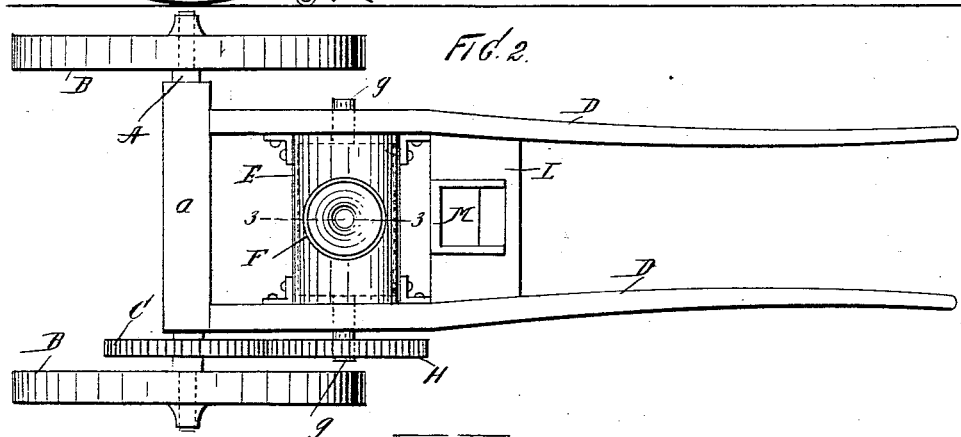
Figure 3:
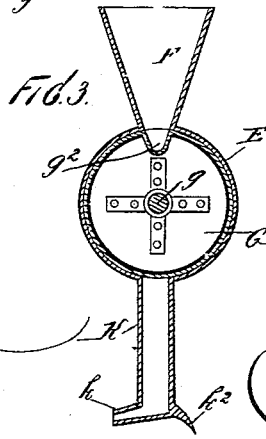

Figure 1 is a side view of my improved corn-dropper; Fig. 2, a plan view, and Fig. 3 a vertical section on the line 3 3 of Fig. 2.

My improved corn planter or dropper comprises an axle A, at each end of which is mounted a wheel B, and adjacent to one of said wheels is a gear-wheel C, which is keyed or otherwise secured to the axle. The axle A passes through a head or hub $a$, and secured to said head or hub $a$ are shafts D, between which is mounted, adjacent to the axle A, a cylindrical or tubular casing E, which is secured to said shafts in any desired manner.

Secured to the upper side of the cylindrical or tubular casing E is a hopper F, which is designed to receive the shelled seed-corn, and mounted in said cylindrical or tubular casing is a revoluble tubular casing G, which is mounted on or secured to a shaft $g$ and which is also free to revolve within said cylindrical or tubular casing E.

Formed in one side of the tubular casing G is a conical cavity or receptacle $g^2$, the base of which is open and directed outwardly and corresponds in form with the lower open end of the hopper F, and the shaft $g$ is extended at each end through the shafts D, and mounted on one end thereof is a gear-wheel H, which is adapted to operate in connection with the gear-wheel C.

The ends of the cylindrical or tubular casing E and of the tubular casing G are preferably closed, and communicating with the cylindrical or tubular casing E, at the bottom thereof, is a tube K, which is provided at its lower end with a backwardly-directed discharge-nozzle $k$ and with a forwardly-directed shovel $k^2$, which may be of any desired size, shape, or form. Arranged forward of the cylindrical or tubular casing E is a plate or board L, the ends of which are secured to the shafts D, and mounted thereon or secured thereto in any desired manner is a seat M.

The operation will be readily understood from the foregoing description, when taken in connection with the accompanying drawings. A horse is hitched between the shafts D in the usual manner, and the hopper F is filled with shelled seed-corn, and as the wheels B, which are rigidly connected with the shaft A, revolve the gear-wheel C is also revolved by said shaft, which in turn revolves the gear-wheel H, which revolves the tubular casing G, and at each revolution of the tubular casing G a grain of corn or a predetermined number of grains of corn are received from the hopper F in the cavity or receptacle $g^2$, and as the tubular casing G revolves the said grain or grains of corn pass out through the tube K and the nozzle $h$ thereof. In this operation the shovel or blade $k^2$ forms a small narrow furrow, into which the grains of corn are deposited, and said grains will be deposited in regular order at each revolution of the tubular casing E. It will be understood also that the cavity or receptacle $g^2$ may be made so as to receive one or any desired number of grains of corn and that the gear-wheels C and H may be so formed as to revolve the tubular casing E with any desired speed, and I also connect in any desired manner with the lower end of the tube K a roller O, which is designed to pulverize the earth around the grains of corn, after which the corn may be covered in the usual or any desired manner, and the roller O may be so formed as to accomplish this purpose if desired, or other means may be provided and connected with the tube G by which this object may be accomplished.

My invention is not limited to the exact form, construction, and arrangement of parts herein described, and I therefore reserve the right to make all such alterations therein and modifications thereof as fairly come within the scope of the invention.

Having fully described my invention, I claim as new and desire to secure by Letters Patent—

1. A corn planter or dropper comprising an axle having a wheel secured to each end thereof, a head or hub through which said axle passes, two shafts secured to said head or hub, a cylindrical or tubular casing mounted between said shafts, a revoluble casing mounted within said cylindrical or tubular casing, a hopper secured to or connected with the upper side of said cylindrical or tubular casing, a tube connected with the lower side thereof, and extending downwardly, a cavity or receptacle formed in the side of said revoluble casing, and adapted to communicate with the lower end of said hopper and with the upper end of said tube, a shaft on which said revoluble casing is mounted, and the ends of which extend through the shafts connected with the head or hub, a gear-wheel mounted on said axle, and a corresponding gear-wheel mounted on said shaft on which the revoluble casing is mounted, substantially as shown and described.

2. A corn planter or dropper comprising an axle having a wheel secured to each end thereof, a head or hub through which said axle passes, two shafts secured to said hub or head, a cylindrical or tubular casing mounted between said shafts, a revoluble casing mounted within said cylindrical or tubular casing, a hopper secured to or connected with the upper side of said cylindrical or tubular casing, a tube connected with the lower side thereof, and extending downwardly, a cavity or receptacle formed in the side of said revoluble casing, and adapted to communicate with the lower end of said hopper and with the upper end of said tube, a shaft on which said revoluble casing is mounted, and the ends of which extend through the shafts connected with the head or hub, a gear-wheel mounted on said axle, and a corresponding gear-wheel mounted on said shaft, on which the revoluble casing is mounted, and the tube connected with the cylindrical or tubular casing being provided with a backwardly-directed discharge spout or nozzle at its lower end and with a forwardly-directed shovel or blade, substantially as shown and described.

In testimony that I claim the foregoing as my invention I have signed my name, in presence of the subscribing witnesses, this 9th day of December, 1895.

HARRY HALL.

Witnesses:
COOK CARLETON,
D. M. KIRLEY.